United States Patent
Youn et al.

(10) Patent No.: US 9,331,851 B2
(45) Date of Patent: May 3, 2016

(54) APPARATUS AND METHOD FOR GIVING THE COMPRESSED ENCRYPTION FUNCTIONALITY TO INTEGER-BASED HOMOMORPHIC ENCRYPTION SCHEMES

(71) Applicant: ELECTRONICS AND TELECOMMUNICATIONS RESEARCH INSTITUTE, Daejeon (KR)

(72) Inventors: Taek-Young Youn, Daejeon (KR); Nam-Su Jho, Daejeon (KR); Ku-Young Chang, Daejeon (KP)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/312,049

(22) Filed: Jun. 23, 2014

(65) Prior Publication Data

US 2015/0180659 A1    Jun. 25, 2015

(30) Foreign Application Priority Data

Dec. 23, 2013    (KR) .................. 10-2013-0161797

(51) Int. Cl.
  *H04L 9/08*    (2006.01)
  *H04L 9/14*    (2006.01)
  *H04L 9/30*    (2006.01)
  *H04L 9/00*    (2006.01)

(52) U.S. Cl.
  CPC .............. *H04L 9/0861* (2013.01); *H04L 9/008* (2013.01); *H04L 9/14* (2013.01); *H04L 9/3066* (2013.01); *H04L 2209/30* (2013.01)

(58) Field of Classification Search
  CPC ......... H04L 9/08; H04L 9/0816; H04L 9/008; H04L 9/3066; H04L 2209/30; H04L 9/14; H04L 9/0861
  USPC .......................................................... 380/44
  See application file for complete search history.

(56) References Cited

U.S. PATENT DOCUMENTS

| | | | |
|---|---|---|---|
| 6,885,748 B1* | 4/2005 | Wang ............................ | 380/201 |
| 7,068,787 B1* | 6/2006 | Ta et al. ........................ | 380/240 |
| 2011/0110525 A1 | 5/2011 | Gentry .......................... | 380/285 |
| 2012/0039473 A1 | 2/2012 | Gentry et al. ................. | 380/277 |

OTHER PUBLICATIONS

Marten Van Dijk et al., "Fully Homomorphic Encryption over the Integers", *Eurocrypt 2010*, May 30, 2010, pp. 24-43, vol. 6110.

(Continued)

*Primary Examiner* — Kambiz Zand
*Assistant Examiner* — Benjamin Kaplan
(74) *Attorney, Agent, or Firm* — Staas & Halsey LLP

(57) ABSTRACT

The present invention relates to a compressed encryption and decryption apparatus comprising: an interface receiving a public key, a secret key and a compression ratio; a memory storing instructions for encryption and decryption of plaintexts; and a processor encrypting and decrypting plaintexts according to the instruction, wherein the instruction comprises instructions performing; generating an extended public key and an extended secret key by revising the public key and the secret key according to the compression ratio; outputting the extended public key; receiving compressed ciphertext; and decrypting the compressed ciphertext using modulo operation for multiplication of the extended secret key and the compressed ciphertext.

8 Claims, 3 Drawing Sheets

(56) References Cited

OTHER PUBLICATIONS

Jean-Sébastien Coron et al., "Fully Homomorphic Encryption over the Integers with Shorter Public Keys", *Crypto 2011*, Aug. 14, 2011, pp. 487-504, vol. 6841.

Jean-Sébastien Coron et al., "Public Key Compression and Modulus Switching for Fully Homomorphic Encryption over the Integers", *Eurocrypt 2012*, Apr. 18, 2012, pp. 446-464, vol. 7237.

Jung Hee Cheon et al., "Batch Fully Homomorphic Encryption over the Integers", *Eurocrypt 2013*, May 26, 2013, pp. 315-335, vol. 7881.

* cited by examiner

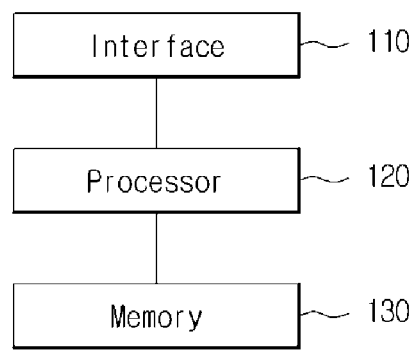
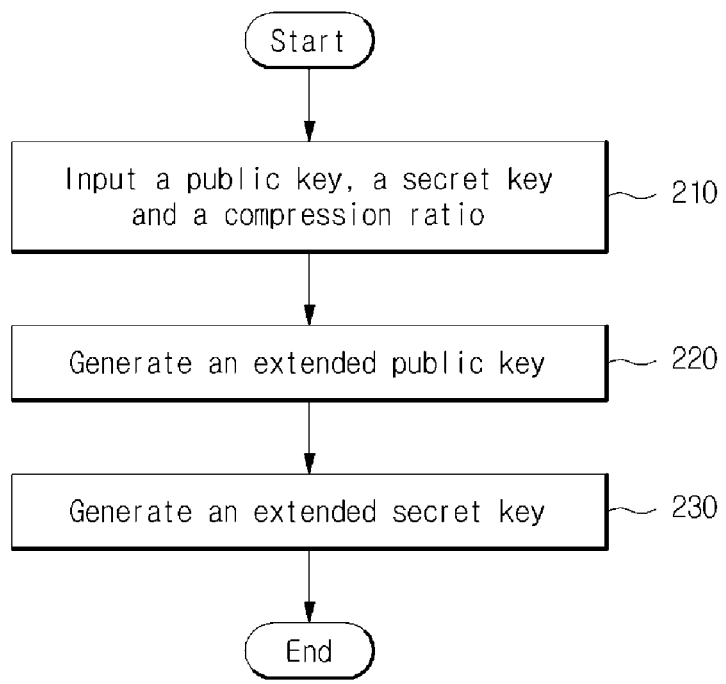

APPARATUS AND METHOD FOR GIVING THE COMPRESSED ENCRYPTION FUNCTIONALITY TO INTEGER-BASED HOMOMORPHIC ENCRYPTION SCHEMES

CROSS REFERENCE TO RELATED APPLICATION

This application claims the benefit of Korean Patent Application No. 10-2013-0161797, filed on Dec. 23, 2013, entitled "Apparatus and method for giving the compressed encryption functionality to integer-based homomorphic encryption schemes", which is hereby incorporated by reference in its entirety into this application.

BACKGROUND OF THE INVENTION

1. Technology Field

The present invention relates to an encryption technology, and more particularly to the technology for giving the compressed encryption functionality to integer-based homomorphic encryption schemes.

2. Description of the Related Art

Homomorphic encryption scheme is a form of encryption which allows operations to be carried out on encrypted data.

Recent researches on designs of the homomorphic encryption have been focused on realization of very large size of a public key which is used in conventional schemes. A research which should be accompanied along with those researches is to reduce cost for storing the encrypted data. Since an application environment which is expected to use homomorphic encryptions requires a serve to store high-volume data such as cloud services or big-data services, it is very important to develop not only techniques for reducing the length of a public key using fixed special resources but also techniques for reducing the size of encrypted data which is expected to be very variable and large.

Most of the techniques proposed to date are configured to encrypt only 1 bit information in a ciphertext. Thus, n(n is predetermined natural number) numbers of ciphertexts are generated for n bit encryption which results in increases in cost for the same level to store those data. Recently, the scheme to encrypt multiple bit information in a single ciphertext has been developed. An existing compressed encryption scheme allows the compressed encryption for 1 bit plaintext information in a single ciphertext when a compression ratio l is determined and then parameters which are corresponding thereto are determined in the design of the homomorphic encryption scheme. About n/l numbers of ciphertexts are generated for the encryption of n bit information so that the storage space efficiency is improved by about l times compared to those techniques which perform the encryption in units of bit. However, this existing compressed encryption scheme cannot use the parameters which are used for other integer-based schemes but should use parameters satisfying certain conditions for the compressed encryption.

SUMMARY OF THE INVENTION

An object of the present invention is to provide an apparatus and method for compressed encryption and decryption which compresses and encrypts multiple plaintext information to a single ciphertext.

Another object of the present invention is to provide an apparatus and method for compressed encryption and decryption which compresses and encrypts multiple plaintext information to a single ciphertext without changing basic parameters and basic algorithms of the homomorphic encryption scheme.

According to an aspect of the present invention, there is provided a compressed encryption and decryption apparatus comprising: an interface receiving a public key, a secret key and a compression ratio; a memory storing instructions for encryption and decryption of plaintexts; and a processor encrypting and decrypting plaintexts according to the instruction, wherein the instruction comprises instructions performing; generating an extended public key and an extended secret key by revising the public key and the secret key according to the compression ratio; outputting the extended public key; receiving compressed ciphertext; and decrypting the compressed ciphertext using modulo operation for multiplication of the extended secret key and the compressed ciphertext.

The step of decrypting the compressed ciphertext using modulo operation for multiplication of the extended secret key and the compressed ciphertext may comprise: calculating an integer value by stripping the decimal part from the multiplied value of the extended secret key and the compressed ciphertext; adding the integer value and the compressed ciphertext; and obtaining plaintext from least significant bits of the added value of the integer value and the compressed ciphertext, wherein the number of least significant bits is according to the compression ratio.

The instruction may further comprise instructions performing: receiving an external extended public key; and compressing and encrypting the plaintext by performing modulo operation to the external extended public key, wherein the external extended public key may be a key which is revised from a public key according to the compression ratio.

The step of compressing and encrypting the plaintext by performing modulo operation to the external extended public key may comprise generating a compressed ciphertext by adding a value resulted from modulo operation according to any one from the external extended public key for the sum of at least one of the external extended public key, and number of bits according to the compression ratio from the plaintext.

According to another aspect of the present invention, there is provided a compressed encryption and decryption method in an encryption method of plaintext by an encryption and decryption apparatus, comprising: receiving a public key, a secret key and a compression ratio; generating an extended public key and an extended secret key by revising the public key and the secret key according to the compression ratio; outputting the extended public key; receiving compressed ciphertext; and decrypting the compressed ciphertext using modulo operation for multiplication of the extended secret key and the compressed ciphertext.

The step of decrypting the compressed ciphertext using modulo operation for multiplication of the extended secret key and the compressed ciphertext may comprise: calculating an integer value by stripping the decimal part from the multiplied value of the extended secret key and the compressed ciphertext; adding the integer value and the compressed ciphertext; and obtaining plaintext from least significant bits of the added value of the integer value and the compressed ciphertext, wherein the number of least significant bits is according to the compression ratio.

The compressed encryption and decryption method may further comprise: receiving an external extended public key; and compressing and encrypting the plaintext by performing modulo operation to the external extended public key, wherein the external extended public key is a key which is revised from a public key according to the compression ratio.

The step of compressing and encrypting the plaintext by performing modulo operation to the external extended public key may comprise generating a compressed ciphertext by adding a value resulted from modulo operation according to any one from the external extended public key for the sum of at least one of the external extended public key, and number of bits according to the compression ratio from the plaintext.

According to an embodiment of the present invention, the present application allows improvement in storage efficiency by compressing and encrypting multiple bit information into a single ciphertext.

In addition, according to an embodiment of the present invention, since the present invention uses general encryption algorithms which perform encryption by a single bit, it can lower the required volume of storage space without deteriorating stability of chipertexts and efficiencies associated with differences in parameters.

In addition, according to an embodiment of the present invention, the present invention allows encryption multiple bit information to a single ciphertext without changing basic configuration of integer-based homomorphic encryption and also decryption back.

BRIEF DESCRIPTION OF THE DRAWINGS

FIG. 1 illustrates a compressed encryption and decryption apparatus according to an embodiment of the present invention.

FIG. 2 is a flowchart illustrating a process for generating an extended public key and an extended secret key by a compressed encryption and decryption apparatus according to an embodiment of the present invention.

DESCRIPTION OF THE EXEMPLARY EMBODIMENTS

Figure 3:
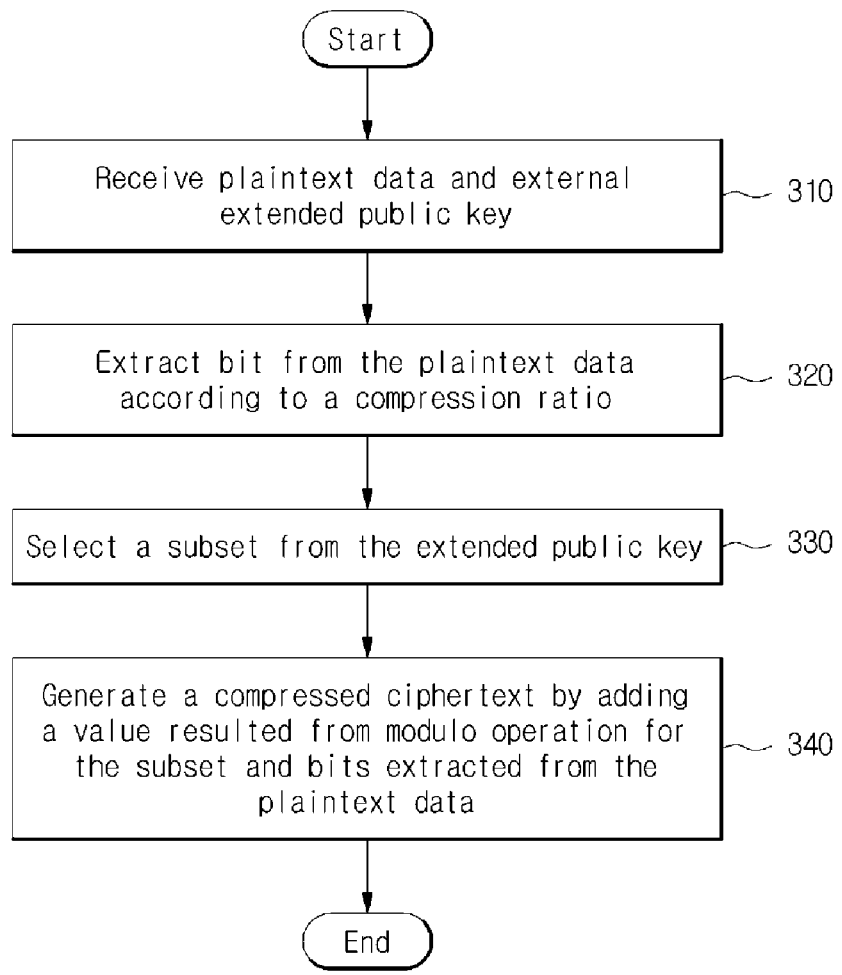
FIG. 3 is a flowchart illustrating a process for encryption of a plaintext by a compressed encryption and decryption apparatus according to an embodiment of the present invention.

While the present invention will be described with reference to particular embodiments and accompanying drawings in more detail, it is to be appreciated that various changes and modifications thereof may be made. There is no intention to limit the invention to those particular embodiments and accompanying drawings but it is to be appreciated that the present invention includes all modifications, alterations, equivalents and substituents included in the spirit and scope of the present invention.

In the present description, an expression such as "transmit" is intended to include not only that a signal is transmitted from one component to another component which are connected directly but also that a signal is transmitted from one component to another component which are connected having a different component in the middle.

Furthermore, it is to be appreciated that a public key and a secret key are the public key and the secret key according to known homomorphic encryption schemes.

FIG. 1 illustrates a compressed encryption and decryption apparatus according to an embodiment of the present invention.

Referring to FIG. 1, a compressed encryption and decryption apparatus comprises an interface 110, a processor 120 and a memory 130.

The interface 110 receives a plaintext, a public key, a secret key, and a compression ratio to be an object for encryption. Here, the interface 110 may receive data from an external device by being equipped with a communication module or extract data from storage medium equipped in the compressed encryption and decryption apparatus. The compression ratio means the number of bits of the plaintext to be included in one compressed ciphertext. The public key and the secret key are the keys generated according to known integer-based homomorphic encryption schemes. Namely, $\eta$-bit ($\eta$ is predetermined natural number) odd number p may be selected as a secret key and a public key may be selected from the set represented by Equation 1 by the secret key p, $$D\gamma,\rho(p)=\{x=p\cdot a+b:a\epsilon Z\cap[(0,2^\gamma,p)b\epsilon Z\cap(-2^\rho,2^\rho)\} \quad \text{Equation 1}$$

wherein, Z is a set of integers which means that the public key can be selected from the set $D_{\gamma,\rho}$ (P) including any element $x_i$ for i=1, . . . , τ. Here, in the detailed description of the present invention, the public key is defined as pk={$x_0$, $x_1$, . . . , $x_\tau$} and it is assumed that $x_0$ is a multiple of p. Particularly, S which is a color of the subset randomly selected from {$x_1, \ldots, x_\tau$} may be generated and a public key including elements in the form of pq+2r for natural numbers q and r may be generated by calculating $$2\sum_{i\subseteq s} x_i \bmod(x_0).$$

Here, one who has selected S cannot know q and r. An integer-based homomorphic encryption and decryption scheme generates a ciphertext having the form of c=pq+2r+m by adding 1 bit plaintext m m to be encrypted to a value calculated with $$2\sum_{i\subseteq s} x_i \bmod(x_0).$$

Therefore, the integer-based homomorphic encryption and decryption scheme performs decryption by performing a modulo operation twice such as the following Equation 2 for c.

$$m=(c \bmod(p))\bmod(2)=(pq+2r+m \bmod(p))\bmod(2) \quad \text{Equation 2}$$

In addition, the integer-based homomorphic encryption and decryption scheme may perform decryption in another form according to implementations. For example, the integer-based homomorphic encryption and decryption scheme calculates q which is a quotient of pq+2r+m divided by p and further calculates (p+1)+2r+m by adding q to pq+2r+m Here, since p+1 is even, the remainder of (p+1)q+2r+m divided by 2 can be restored to a plaintext. An exemplary embodiment of the homomorphic encryption and decryption scheme has been described above and it can be modified from the form described above according to implementation. However, the encryption process using a public key will not deviate from the basic process which includes generation of a random number of pq+2r and addition of a plaintext to the random number. Further, a compressed encryption and decryption apparatus according to an embodiment of the present invention which will be described below uses public keys and secret keys according to any one of various know types of the integer-based homomorphic encryption and decryption scheme which has been described above.

The interface 110 may receive a compressed ciphertext to which a plaintext is encrypted and an extended public key from an external device. The extended public key is a public key having a part of contents which are changed or added from the public key used in the homomorphic encryption scheme to provide compressed encryption according to compression ratio. Hereinafter, the extended public key received from an external device is called as an external extended public key.

The processor 120 compresses and encrypts plaintexts using an external extended public key according to instructions stored in the memory. The processor 120 may generate an extended public key and an extended secret key using a public key, a secret key and a compression ratio according to instructions stored in the memory, and decrypt a compressed ciphertext using the extended secret key to generate a plaintext.

The memory 130 stores instructions to conduct the above-mentioned functions of the processor 120.

A process for generating an extended public key and an extended secret key which is performed by the processor 120 according to the above-mentioned instructions will be described below in more detail. The process will be described mainly with a compressed encryption and decryption apparatus to explain simply and clearly the processes performed by the processor 120 of the present invention.

FIG. 2 is a flowchart illustrating a process for generating an extended public key and an extended secret key by a compressed encryption and decryption apparatus according to an embodiment of the present invention.

Referring to FIG. 2, in Step 210, the compressed encryption and decryption apparatus receives a public key, a secret key and a compression ratio through the interface 110.

In Step 220, the compressed encryption and decryption apparatus generates an extended public key having the form of pq+$\xi^l$ for an integer q and r by changing the public key or adding a part of information of the public key. Namely, the compressed encryption and decryption apparatus generates an extended public key by adding a compression ratio l to the existing public key information or changing the public key itself by adding $x'_i = 2^l x_i$, mod ($x_0$) in addition to $x_i$ but it can be different according to implementations.

In Step 230, the compressed encryption and decryption apparatus generates the extended secret key to $\bar{p}/p$ ($\bar{p} = -p \bmod (2^l)$). That is, $\bar{p}$ is a value which satisfies the following Equation 3.

$$p + \bar{p} = p - p = 0 \bmod(2^l)$$ Equation 3

Here, when a secret key includes secret information in addition to the information relating to p in the integer-based homomorphic encryption scheme, the secret information may be an extended secret key.

As described, the extended public key and the extended secret key which are generated by the compressed encryption and decryption apparatus according to an embodiment of the present invention may include a public key and a secret key used in the integer-based homomorphic encryption scheme, respectively and additional information to provide compressed encryption functionalities to the corresponding public key and secret key.

FIG. 3 is a flowchart illustrating a process for encryption of a plaintext by a compressed encryption and decryption apparatus according to an embodiment of the present invention.

Referring to FIG. 3, in Step 310, the compressed encryption and decryption apparatus receives a plaintext and an external extended public key pk$^+$={$x_0, x_1, \ldots, x_\tau, 1$} through the interface. In Step 320, the compressed encryption and decryption apparatus extracts l bits ($^{M \in \{0,1\}^l}$) from the plaintext according to a compression ratio.

In Step 330, the compressed encryption and decryption apparatus selects a subset S ⊂ (1, . . . , τ) from the external extended public key.

In Step 340, the compressed encryption and decryption apparatus generates a compressed ciphertext C to which the plaintext is encrypted by adding a product value modulo first element of the subset and l bits plaintext. The product value is product of $2^l$ and sum of every element of the subset. The compressed encryption and decryption apparatus encrypts the plaintext according to the following Equation 4.

$$C = M + 2^l \sum_{i \in S} x_i \bmod(x_0)$$ Equation 4

Here, when the extended public key further includes $x'_i = 2^l x_i \bmod(x_0)$, the compressed encryption and decryption apparatus may encrypt the plaintext according to the following Equation 5.

$$C = M + \sum_{i \in S} x'_i \bmod(x_0)$$ Equation 5

Figure 4:
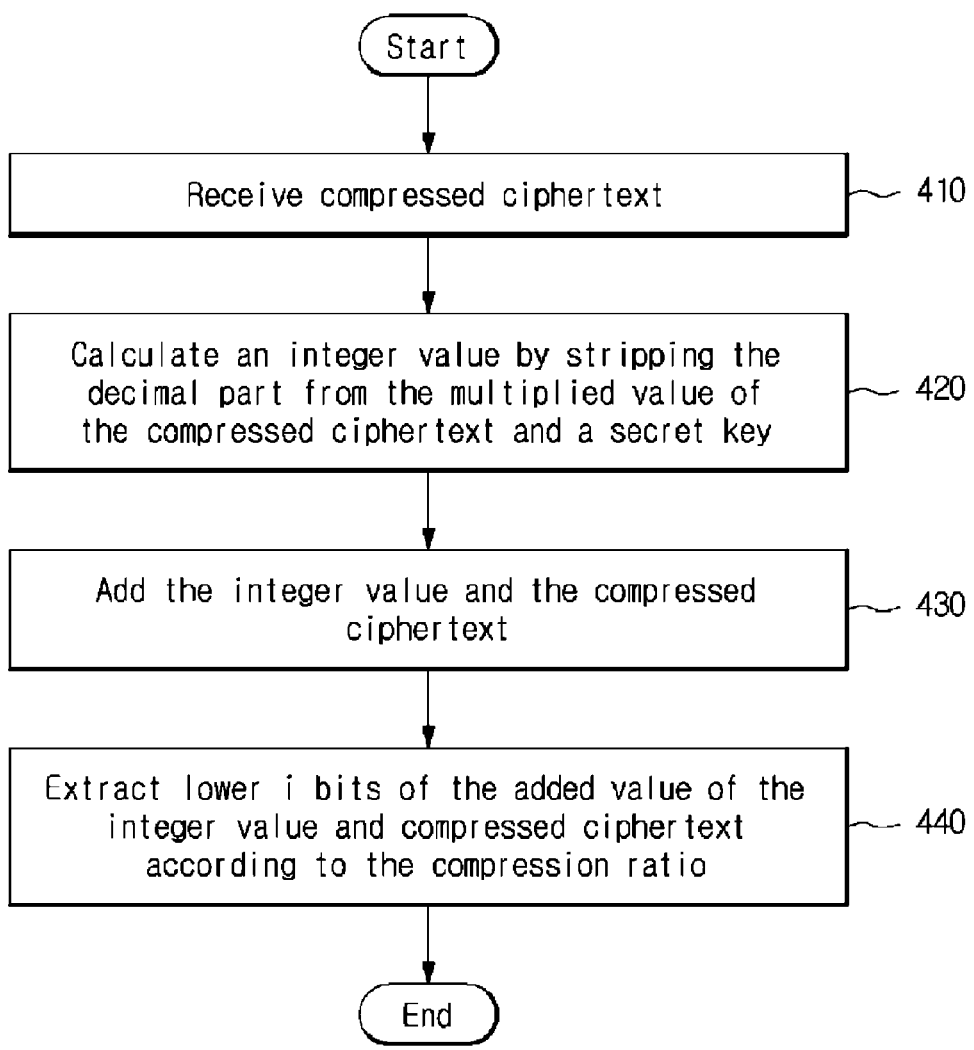
FIG. 4 is a flowchart illustrating a process for decryption of a compressed ciphertext by a compressed encryption and decryption apparatus according to an embodiment of the present invention.

FIG. 4 is a flowchart illustrating a process for decryption of a compressed ciphertext by a compressed encryption and decryption apparatus according to an embodiment of the present invention.

Referring to FIG. 4, in Step 410, the compressed encryption and decryption apparatus receives a compressed ciphertext through the interface 110. It may be assumed that the compressed ciphertext is a compressed ciphertext encrypted through an extended public key generated by the compressed encryption and decryption apparatus.

In Step 420, the compressed encryption and decryption apparatus calculates an integer value by stripping the decimal part from the multiplied value of the compressed ciphertext C and a secret key.

In Step 430, the compressed encryption and decryption apparatus adds the integer value and the compressed ciphertext. The processes from Step 320 to Step 330 may be represented by the following Equation 6.

$$C + \lfloor C \cdot (\bar{p}/p) \rfloor$$ Equation 6

In Step 440, the compressed encryption and decryption apparatus extracts a lower l bits (an l number of least significant bits) of the added value of the integer value and the compressed ciphertext, and calculates the extracted lower l bits into a plaintext. That is, the compressed encryption and decryption apparatus may decrypt the compressed ciphertext by employing the following Equation 7 wherein M is a plaintext of l bits.

$$M = C + \lfloor C \cdot (\bar{p}/p) \rfloor \bmod(2^l)$$ Equation 7

Accordingly, since the compressed encryption and decryption apparatus according to an embodiment of the present invention uses general encryption algorithms which perform encryption by a single bit, it can lower the required volume of storage space without deteriorating stability of chipertexts and efficiencies associated with differences in parameters. In addition, the compressed encryption and decryption apparatus according to an embodiment of the present invention allows encryption multiple bit information to a single ciphertext without changing basic configuration (parameters and algorithms) of integer-based homomorphic encryption and also decryption back.

The spirit of the present invention has been described by way of example hereinabove, and the present invention may be variously modified, altered, and substituted by those skilled in the art to which the present invention pertains without departing from essential features of the present invention. Accordingly, the exemplary embodiments disclosed in the present invention and the accompanying drawings do not limit but describe the spirit of the present invention, and the scope of the present invention is not limited by the exemplary embodiments and accompanying drawings. The scope of the present invention should be interpreted by the following claims and it should be interpreted that all spirits equivalent to the following claims fall within the scope of the present invention.

What is claimed is:

1. An apparatus, comprising:
    an interface receiving a public key, a secret key and a compression ratio;
    a memory storing instructions for encryption and decryption of plaintexts; and
    a processor encrypting and decrypting plaintexts according to the instructions, so as to provide compressed encryption and decryption functionality of integer-based homomorphic encryption by:
        generating an extended public key and an extended secret key by revising the public key and the secret key according to the compression ratio;
        outputting the extended public key;
        receiving compressed ciphertext generated with the extended public key; and
        decrypting the compressed ciphertext using modulo operation for multiplication of the extended secret key and the compressed ciphertext,
    wherein the compression ratio is a number of bits of the plaintext to be included in the compressed ciphertext.

2. The apparatus of claim 1, wherein the decrypting of the compressed ciphertext using modulo operation for multiplication of the extended secret key and the compressed ciphertext comprises:
    calculating an integer value by stripping the decimal part from the multiplied value of the extended secret key and the compressed ciphertext;
    adding the integer value and the compressed ciphertext; and
    obtaining plaintext from least significant bits of the added value of the integer value and the compressed ciphertext,
    wherein the number of least significant bits is according to the compression ratio.

3. The apparatus of claim 1, wherein the processor performs:
    receiving an external extended public key; and
    compressing and encrypting the plaintext by performing modulo operation to the external extended public key,
    wherein the external extended public key is a key which is revised from a public key according to the compression ratio.

4. The apparatus of claim 3, wherein the compressing and encrypting the plaintext by performing modulo operation to the external extended public key comprises:
    generating a compressed ciphertext by adding a value resulted from a modulo operation according to any one from the external extended public key for the sum of at least one of the external extended public key, and number of bits according to the compression ratio from the plaintext.

5. A method of providing compressed encryption and decryption functionality of integer-based homomorphic encryption, the method comprising:
    receiving a public key, a secret key and a compression ratio;
    generating, by a processor, an extended public key and an extended secret key by revising the public key and the secret key according to the compression ratio;
    outputting the extended public key;
    receiving compressed ciphertext generated with the extended public key; and
    decrypting the compressed ciphertext using modulo operation for multiplication of the extended secret key and the compressed ciphertext,
    wherein the compression ratio is a number of bits of the plaintext to be included in the compressed ciphertext.

6. The method of claim 5, wherein decrypting the compressed ciphertext using modulo operation for multiplication of the extended secret key and the compressed ciphertext comprises:
    calculating an integer value by stripping a decimal part from the multiplied value of the extended secret key and the compressed ciphertext;
    adding the integer value and the compressed ciphertext; and
    obtaining plaintext from least significant bits of the added value of the integer value and the compressed ciphertext,
    wherein the number of least significant bits is according to the compression ratio.

7. The method of claim 5, further comprising:
    receiving an external extended public key; and
    compressing and encrypting the plaintext by performing modulo operation to the external extended public key,
    wherein the external extended public key is a key which is revised from a public key according to the compression ratio.

8. The method of claim 7, wherein compressing and encrypting the plaintext by performing modulo operation to the external extended public key comprises generating a compressed ciphertext by adding a value resulted from modulo operation according to any one from the external extended public key for the sum of at least one of the external extended public key, and number of bits according to the compression ratio from the plaintext.

* * * * *